US009998525B1

(12) United States Patent
Lipus et al.

(10) Patent No.: US 9,998,525 B1
(45) Date of Patent: Jun. 12, 2018

(54) REDUCING TRANSMISSIONS OF REDUNDANT THIRD-PARTY CONTENT OVER A NETWORK

(71) Applicant: Google LLC, Mountain View, CA (US)

(72) Inventors: Timothy S. Lipus, Sunnyvale, CA (US); Matthew Strecker Burriesci, Half Moon Bay, CA (US)

(73) Assignee: Google LLC, Mountain View, CA (US)

( * ) Notice: Subject to any disclaimer, the term of this patent is extended or adjusted under 35 U.S.C. 154(b) by 61 days.

(21) Appl. No.: 15/212,965

(22) Filed: Jul. 18, 2016

(51) Int. Cl.
G06F 15/16 (2006.01)
H04L 29/08 (2006.01)
H04L 29/06 (2006.01)

(52) U.S. Cl.
CPC .......... H04L 67/06 (2013.01); H04L 65/4023 (2013.01); H04L 65/601 (2013.01)

(58) Field of Classification Search
USPC ........ 709/205, 217, 218, 219, 223, 225, 226
See application file for complete search history.

(56) References Cited

U.S. PATENT DOCUMENTS

| 7,757,253 | B2 * | 7/2010 | Rappaport | G06F 3/0482 |
| | | | | 725/41 |
| 8,548,981 | B1 | 10/2013 | Bhattacharjee et al. | |
| 9,785,924 | B2 * | 10/2017 | Zmuda | G06Q 20/10 |
| 2005/0060229 | A1 * | 3/2005 | Riedl | G06Q 30/02 |
| | | | | 705/14.61 |
| 2006/0041597 | A1 | 2/2006 | Conrad et al. | |
| 2007/0185762 | A1 * | 8/2007 | Takahashi | G06Q 30/02 |
| | | | | 705/14.4 |
| 2008/0039197 | A1 * | 2/2008 | Walker | G07F 17/32 |
| | | | | 463/30 |
| 2008/0076506 | A1 * | 3/2008 | Nguyen | G07F 17/3218 |
| | | | | 463/16 |
| 2008/0104194 | A1 | 5/2008 | Tsun et al. | |
| 2008/0262913 | A1 | 10/2008 | Reitz et al. | |
| 2009/0106659 | A1 * | 4/2009 | Rosser | G06F 17/30056 |
| | | | | 715/730 |
| 2009/0172727 | A1 | 7/2009 | Baluja et al. | |

(Continued)

OTHER PUBLICATIONS

AdSense Help, "The same ads appear on the page," Google.com, retrieved on Jul. 18, 2016. Retrieved from the Internet: URL<https://support.google.com/adsense/answer/32843?hl=en&ref_topic=1307496>, 2 pages.

(Continued)

Primary Examiner — Liancghe A Wang
(74) Attorney, Agent, or Firm — Fish & Richardson P.C.

(57) ABSTRACT

This document describes computer-implemented systems, methods, devices, and other techniques for reducing the amount of redundant third-party content that is transported over a network for presentation with an electronic document. In some implementations, a computing system includes a deduplication apparatus that determines, in response to identifying that a particular instance of third-party content has previously been selected for display in a particular presentation of the electronic document, and based at least on a display characteristic of the electronic document, whether one or more other instances of third-party content that are deemed redundant to the particular instance of third-party content are eligible for selection responsive to the request.

17 Claims, 6 Drawing Sheets

(56) References Cited

U.S. PATENT DOCUMENTS

2010/0083305 A1* 4/2010 Acharya .......... H04N 21/44004
725/34
2012/0004899 A1 1/2012 Arshi
2016/0119400 A1* 4/2016 Elliott .................... H04L 67/02
709/203
2016/0358356 A1* 12/2016 Heynen ................. G09G 5/377

OTHER PUBLICATIONS

Cjj, "Duplicate ads are often shown across multiple adsense units on the same page," Google Product Forums, Jan. 7, 2010 [retrieved on Jul. 18, 2016]. Retrieved from the Internet: URL<https://productforms.google.com/forum/?hl=en#!category-topic/adsense/working-with-my-ads/okXKC4CBk81>, 3 pages.

Striver, "Duplicate ads being shown—block them?" Google Product Forums, Jan. 17, 2014 [retrieved on Jul. 18, 2016]. Retrieved from the Internet: URL:<https://productforums.google.com/forum/#!topic/adsense/a0gid4T5kiU>, 4 pages.

* cited by examiner

REDUCING TRANSMISSIONS OF REDUNDANT THIRD-PARTY CONTENT OVER A NETWORK

TECHNICAL FIELD

This specification generally relates to data processing, and reducing an amount of redundant content transmitted over a network for presentation in an electronic document.

BACKGROUND

The Internet facilitates the exchange of information and transactions between users across the globe. This exchange of information enables distribution of content to a variety of users. In some situations, content from multiple different sources can be integrated into a single electronic document to create a composite document (e.g., a host electronic document). For example, a portion of the content included in the electronic document may be selected (or specified) by a publisher of the electronic document. A different portion of content (e.g., digital third-party content) can be provided by a third-party (e.g., an entity that is not a publisher of the electronic document). In some situations, the third-party content is selected for integration with the electronic document after a user has already requested presentation of the electronic document. For example, machine-executable instructions included in the electronic document can be executed by a user device when the electronic document is presented at the user device, and the instructions can enable the user device to contact one or more remote servers to obtain third-party content that will be integrated into the electronic document.

SUMMARY

This document generally describes systems, methods, devices, and other techniques for reducing occurrences of redundant third-party content in presentations of electronic documents. Some web pages, native applications, and other electronic documents include multiple slots (e.g., display regions) for displaying third-party content that is provided by parties other than a publisher of the electronic document. A content distribution system may be configured to select particular instances of third-party content to display in the slots, and in some instances may select instances of third-party content that are redundant to each other for display in different slots of the same electronic document. Redundant third-party content is not always desirable, however. Not only may end users find redundant third-party content distracting, but computing resources at the content distribution system and bandwidth of a network that transports third-party content to client computers can be unnecessarily expended on processing and transmitting redundant instances of third-party content. Accordingly, techniques are described herein by which redundant selections of third-party content can be blocked or permitted depending on the particular context of a request. As such, the amount of redundant third-party content selections that the content distribution system makes over a period of time can be reduced, while also leaving flexibility with the system to make redundant third-party content selections in appropriate circumstances.

Some implementations of the subject matter described herein include a computing system. The system can include one or more content storage devices, a front-end server, a deduplication apparatus, and a content selection apparatus. The one or more content storage devices can store third-party content that have been made available by various third parties for distribution over a network. The front-end server can (i) receive a request for third-party content to display in a particular presentation of an electronic document at a client device and (ii) serve third-party content identified in response to the request over the network and to the client computing device for display in the particular presentation of the electronic document. The deduplication apparatus can determine, in response to identifying that a particular instance of third-party content has previously been selected for display in the particular presentation of the electronic document, and based at least on a display characteristic of the electronic document, whether one or more other instances of third-party content that are deemed redundant to the particular instance of third-party content are eligible for selection responsive to the request. The content selection apparatus can select a second instance of third-party content, from among a group of eligible third-party content stored on the one or more content storage devices, to return to the client computing device in response to the request, wherein based on an indication from the deduplication apparatus that the one or more redundant instances of third-party content are ineligible for selection responsive to the request, the content selection apparatus excludes the one or more redundant instances of third-party content from the group of eligible third-party content such that the second instance of third-party content that is selected to return to the client computing device in response to the request is not among the one or more redundant instances of third-party content.

These and other implementations can optionally include one or more of the following features.

The deduplication apparatus can determine whether the one or more redundant instances of third-party content are eligible for selection responsive to the request based on a distance between (i) a first proposed display position of the particular instance of third-party content in the particular presentation of the electronic document and (ii) a second proposed display position for the requested third-party content in the particular presentation of the electronic document.

The distance can be a vertical distance between (i) a first proposed display position of the particular instance of third-party content in the particular presentation of the electronic document and (ii) a second proposed display position for the requested third-party content in the particular presentation of the electronic document.

The deduplication apparatus can determine whether the one or more redundant instances of third-party content are eligible for selection responsive to the request by: identifying a display size of a user interface at the client device in which the particular presentation of the electronic document is to be displayed; and determining, based on the identified display size and proposed display positions of the requested third-party content and the particular instance of third-party content, whether the requested third-party content and the particular instance of third-party content would be displayed concurrently with each other within the user interface.

The deduplication apparatus can determine whether the one or more redundant instances of third-party content are eligible for selection responsive to the request based on whether a pre-defined maximum number of redundant instances of third-party content have previously been selected for display in the particular presentation of the electronic document.

The deduplication apparatus can be configured: (i) to identify a count that indicates a number of times that instances of third-party content deemed redundant to the particular instance of third-party content have been previously provided for presentation, in one or more presentations of the electronic document or other electronic documents, to a same user that is associated with the request or to the same client computing device associated with the request; and (ii) to determine, based on the count, whether the one or more redundant instances of third-party content are eligible for selection responsive to the request.

The deduplication apparatus can determine whether the one or more redundant instances of third-party content are eligible for selection responsive to the request further based on a characteristic of the particular instance of third-party content.

The characteristic of the at least one of the redundant instances of third-party content can include a click-through rate or a conversion rate of the particular instance of third-party content.

The deduplication apparatus can determine whether the one or more redundant instances of third-party content are eligible for selection responsive to the request further based on a score associated with at least one of the redundant instances of third-party content, wherein the score indicates a level of user satisfaction associated with the at least one of the redundant instances of third-party content.

The electronic document can be a web page, a word processing document, a spreadsheet, a slide show, or a screen of a native application installed on the client computing device.

The particular instance of third-party content can include at least one of an image, an animation, a video, or text.

The computing system can deem the one or more other instances of third-party content redundant to the particular instance of third-party content based on at least one of (i) the one or more other instances of third-party content being identical to the particular instance of third-party content, (ii) the one or more other instances of third-party content and the particular instance of third-party content being provided to the computing system by a same or related third party, or (iii) the one or more other instances of third-party content relating to common subject matter as the particular instance of third-party content.

Some implementations of the subject matter described herein can include a computer-implemented method. The method can include receiving, by a computing system, a request for third-party content to display in a particular presentation of an electronic document at a client computing device; identifying, by the computing system, that a first instance of third-party content has previously been selected for display in the particular presentation of the electronic document; determining, by the computing system and based at least on a display characteristic of the electronic document, an eligibility of one or more instances of third-party content that are deemed redundant to the first instance of third-party content for selection responsive to the request; in response to determining that the one or more redundant instances of third-party content are ineligible for selection responsive to the request, excluding the one or more redundant instances of third-party content from a group of eligible instances of third-party content; selecting, from among the group of eligible instances of third-party content and based on one or more selection criteria, a second instance of third-party content to return to the client computing device responsive to the request; and transmitting, from the computing system and to the client computing device for display in the particular presentation of the electronic document, the second instance of third-party content.

These and other implementations can optionally include one or more of the following features.

The method can include identifying a first position in the particular presentation of the electronic document at which the first instance of third-party content is proposed for display; identifying a second position in the particular presentation of the electronic document at which the requested instance of third-party content is proposed for display; determining a distance between the first position and the second position in the particular presentation of the electronic document; and determining the eligibility of the one or more instances of third-party content that are deemed redundant to the first instance of third-party content for selection responsive to the request based on the distance.

The method can include identifying a performance characteristic associated with the first instance of third-party content; and determining the eligibility of the one or more instances of third-party content that are deemed redundant to the first instance of third-party content based on the performance characteristic of the first instance of third-party content.

The performance characteristic of the first instance of third-party content can include at least one of a conversion rate associated with the first instance of third-party content or a click-through rate associated with the first instance of third-party content.

Some implementations of the subject matter described herein can include one or more non-transitory computer-readable storage devices storing instructions thereon that, when executed by one or more processors, cause performance of operations. The operations can include receiving, by a computing system, a request for third-party content to display in a particular presentation of an electronic document at a client computing device; identifying, by the computing system, that a first instance of third-party content has previously been selected for display in the particular presentation of the electronic document; determining, by the computing system and based at least on a display characteristic of the electronic document, an eligibility of one or more instances of third-party content that are deemed redundant to the first instance of third-party content for selection responsive to the request; in response to determining that the one or more redundant instances of third-party content are ineligible for selection responsive to the request, excluding the one or more redundant instances of third-party content from a group of eligible instances of third-party content; selecting, from among the group of eligible instances of third-party content and based on one or more selection criteria, a second instance of third-party content to return to the client computing device responsive to the request; and transmitting, from the computing system and to the client computing device for display in the particular presentation of the electronic document, the second instance of third-party content.

BRIEF DESCRIPTION OF DRAWINGS

Like numbers and references among the drawings indicate like elements.

DETAILED DESCRIPTION

Figure 1:
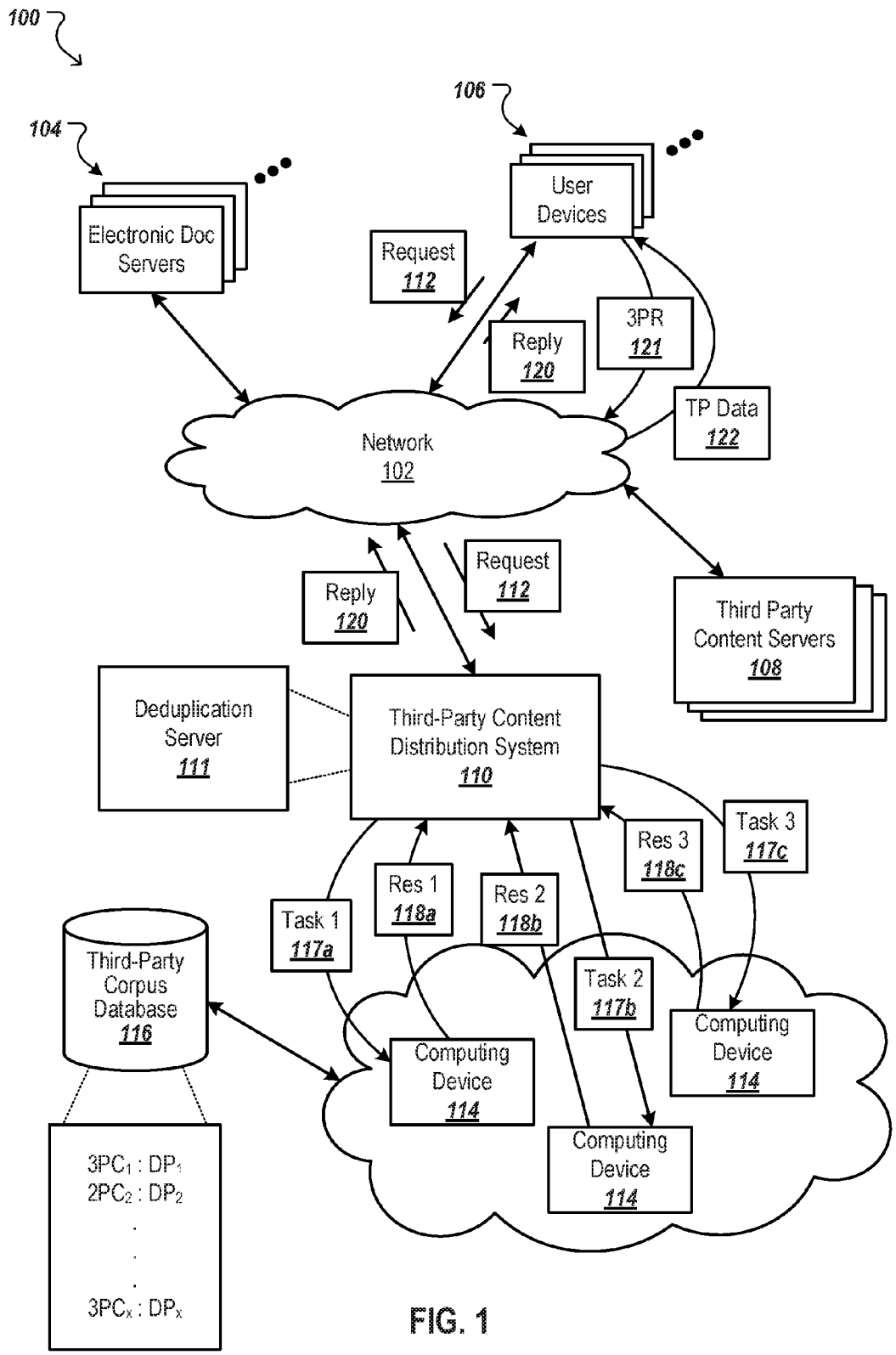
FIG. 1 is a block diagram of an example environment in which third-party content is distributed for presentation with electronic documents.

This specification discloses systems, methods, devices, and other techniques that facilitate distribution of third-party content for integration into an electronic document. The electronic document can be provided by a publisher, and the third-party content can be provided by an entity (e.g., a third-party) that differs from the publisher. As discussed in more detail below, the selection of the third-party content can be performed by a set of computing devices (e.g., specially programmed and/or configured devices) so as to optimize an amount of redundant third-party content that is eligible to appear in a particular presentation of an electronic document. For example, a web page can include multiple slots for the display of third-party content, and each slot can be configured to present a respective instance of third-party content when the web page is rendered at a computing device. The web page may include a script, for example, that calls a content distribution system to return respective instances of third-party content for display in the respective third-party content slots of the web page.

In some instances, the content distribution system may process the requests for each instance of third-party content in a document substantially independently of each other, which can result in redundant third-party content (e.g., identical instances of third-party content or instances of third-party content associated with a same third-party content provider) being selected for display in different slots in the same presentation of the document. Redundant content may be selected by the content distribution system, for example, if substantially the same or similar criteria are used to select instances of third-party content for different slots in the web page. In some instances, the selection of redundant third-party content for presentation in the same view (e.g., a particular presentation) of an electronic document is undesirable because the content distribution system may consume unnecessary CPU cycles in selecting duplicative third-party content in separate selection procedures. Additionally, network bandwidth between servers of the content distribution system and a client computer presenting the electronic document may be needlessly consumed in transporting redundant third-party content. Moreover, the latency in loading an electronic document at a client device may increase as a result of separate third-party content requests that return redundant instances of third-party content, when perhaps fewer (e.g., a single) interaction between the client computer and content distribution system would have been sufficient to obtain a single instance of third-party content to display in multiple third-party content slots of the electronic document.

Although redundant third-party content can be problematic, in some instances, users, publishers, and/or third-party content providers may specify that redundant third-party content is permissible. Accordingly, this specification discloses techniques by which a content distribution system optimizes eligibility of redundant third-party content for selection in presentations of electronic documents, so as to reduce the frequency of redundant third-party content selections, while also permitting redundant third-party content in appropriate circumstances. The content distribution system may account for various criteria in determining whether to make redundant third-party content eligible for selection in response to third-party content requests, including characteristics of the computing device that requested the third-party content, characteristics of the electronic document itself, characteristics of a publisher of the electronic document, characteristics of providers of the third-party content, or a combination of these and other factors discussed herein.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and the electronic server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request for third-party content 112, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the content distribution system 110. Similarly, data specifying keywords associated with the electronic document ("document keywords") or entities (e.g., people, places, or things) that are referenced by the electronic document can also be included in the request 112 (e.g., as payload data) and provided to the content distribution system 110 to facilitate identification of third-party content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 106 can also be provided in the request 112, such as information that identifies a model of the user device 106, a configuration of the user device 106, or a size (e.g., physical size or resolution) of an electronic display (e.g., touchscreen or desktop monitor) on which the electronic document is presented. Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 selects third-party content that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document to remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content ($3PC_{1-x}$). The millions of available third-party content can be indexed, for example, in a third-party corpus database 116. Each third-party content index entry can reference the corresponding third-party content and/or include distribution parameters ($DP_1$-$DP_x$) (e.g. selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation. The distribution parameters can also specify a bid and/or budget for distributing the particular third-party content.

The identification of the eligible third-party content can be segmented into multiple tasks 117*a*-117*c* that are then assigned among computing devices within the set of multiple computing devices 114. For example, different computing devices in the set 114 can each analyze a different portion of the third-party corpus database 116 to identify various third-party content having distribution parameters that match information included in the request 112. In some implementations, each given computing device in the set 114 can analyze a different data dimension (or set of dimensions) and pass results (Res 1-Res 3) 118*a*-118*c* of the analysis back to the third-party content distribution system 110. For example, the results 118*a*-118*c* provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more instances of third-party content that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request (3PR) 121 to the third-party content server 108 to obtain a given winning third-party content from the third-party content server 108. In response to the request, the third-party content server 108 will transmit, to the user device 106, third-party data (TP Data) 122 that causes the given winning third-party content to be incorporated to the electronic document and presented at the user device 106.

The content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

In some implementations, the content distribution system 110 may select winning third-party content in response to a given request from among a set of third-party content items (e.g., instances of third-party content) that have been deemed eligible to return to the user device 106 in response to that request. Eligible third-party content can be identified on a per-request basis according to various data specified in the request, or context associated with the request. For example, the request may indicate a permissible size or aspect ratio of the requested third-party content, and the content distribution system 100 may filter the total set of available third-party content to a set of eligible content that satisfies the size or aspect ratio constraint, and any other applicable constraints. The evaluation process for selecting winning third-party content can then be performed only with respect to the set of eligible third-party content. In some examples, the evaluation process may involve scoring and ranking third-party content items. The winning third-party content item may be the highest-ranked item according to the scores. In some implementations, the ineligible third-party content may be excluded from the total set of available content before the content is scored and ranked. In some implementations, the ineligible third-party content may be excluded from the total set of available content after the content is scored and ranked.

As described further with respect to FIGS. 2A-5, the content distribution system 110 may be configured to block (or otherwise reduce) redundant instances of third-party content from being presented in a single presentation of the electronic document (e.g., a single viewing of the electronic document). The system 110 can prevent redundant instances of third-party content from occurring within a single presentation by excluding the redundant content from the evaluation process, so that redundant content cannot be selected as winning content responsive to a request. For example, a web page may include two content slots that are designated for displaying respective instances of third-party content. The content distribution system 110 may perform a first evaluation process to select a first instance of electronic content for display in a first of the content slots. After the first instance of electronic content is selected, the system 110 may then perform a second evaluation process to select a second instance of electronic content for display in a second of the content slots. The system 110 may exclude the first instance of electronic content and other instances of third-party content that are redundant to the first instance (e.g., provided by a same source or entity) from the second evaluation process. In some implementations, a deduplication server 111 of the content distribution system 110 may determine whether redundant third-party content is permissible for a particular request. The content distribution system 110 then includes or excludes redundant third-party content from an evaluation process according to the determination of the deduplication server 111. Various criteria can affect whether redundant third-party content is eligible in a given evaluation process. These criteria can, in some implementations, be derived from context associated with a third-party content request and can include characteristics of a user associated with a third-party content request, characteristics of the user device 106 that will display an electronic document with selected third-party content, characteristics of the electronic document itself, characteristics of a publisher of the electronic document, characteristics of third-party content providers, or a combination of these and other factors discussed herein.

In some implementations, the third-party content distribution system 110 may include a single deduplication server 111 that communicates with each of multiple different selection servers (e.g., each of multiple computing devices 114). A single presentation of an electronic document may include multiple third-party content slots and a respective third-party content request 112 may be made to the system 110 for each of separate slots in the document. In some instances, the requests 112 for the various slots may be routed to different selection servers (e.g., different computing devices) for selection of a winning third-party content item to return responsive to the respective requests 112. Before making a final selection for a request 112, the particular selection server that processes the request may query the deduplication server 111 to determine whether any redundant third-party content should be excluded. Because a common deduplication server 111 interacts with each of the different selection servers, the deduplication server 111 is capable of correlating instances of content served in response to various requests for the same presentation of an electronic document. For example, the deduplication server 111 can correlate each request and winning third-party content for each request to a view ID that identifies the particular page view (presentation) of an electronic document, which can be beneficial particularly when the system 110 receives requests for content to present in the same presentation of a document in separate requests.

Figure 2A:
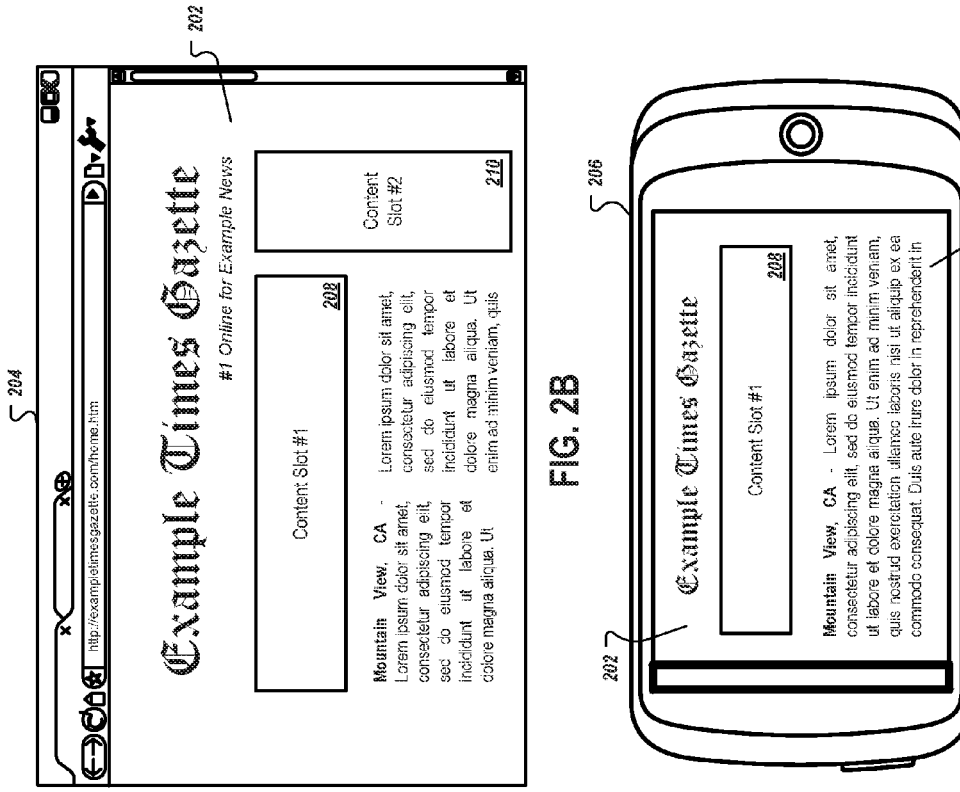
FIGS. 2A-2C depict example presentations of an electronic document.
Figure 2B:
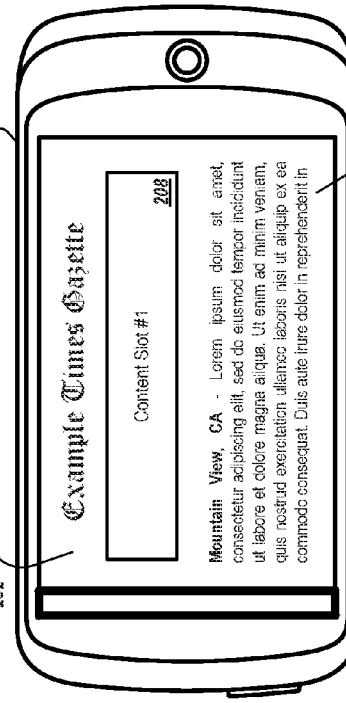
Figure 2C:
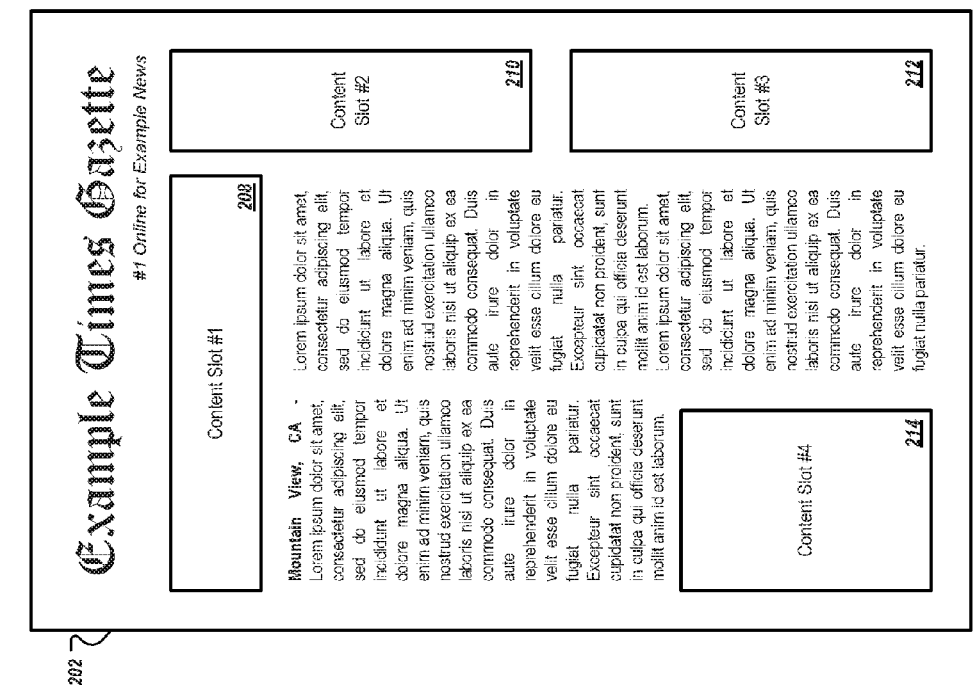

FIGS. 2A-2C depict example presentations of an electronic document 202, and illustrate how display characteristics of the document 202 and a display configuration of a user device can affect the eligibility of redundant third-party content for display. As FIG. 2A shows, the document 202 includes multiple content slots 208-214, which define respective regions of the electronic document 202 for displaying third-party content items. In this example, the document 202 is a web page for an Internet-based newspaper. FIG. 2A is a zoomed-out view of the document 202 that shows an entirety of the document's length and width. In the zoomed-out view, all four content slots 208, 210, 212, and 214 can be seen concurrently with each other. In practice, however, the document 202 may be larger than the viewing area provided on a screen of a user's device, such that only a portion of the document 202 is displayed within the viewing area at a time. An application on the user's device, for example, may provide a control that allows the document to be panned, scrolled, or zoomed to enable a user to view different portions of the document 202. In some implementations, the display configuration of the user device and the arrangement of content slots 208-214 within the document 202 can be provided as input to a content distribution system. Based on such input, the system can determine whether redundant instances of third-party content are eligible for display in the document 202 at all, and if so, which combinations of content slots 208-214 are or are not permitted to display redundant third-party content.

FIGS. 2B and 2C illustrate, for example, how the display configuration of a user device can impact the eligibility of redundant third-party content in the document 202. In FIG. 2B, a first display configuration displays the document 202 within a relatively large viewing area 204 in a web browser on a larger screen of a user device (e.g., a desktop LCD monitor). FIG. 2C, in contrast, provides a second display configuration that shows the document 202 within a smaller viewing area 208 of a native application on a mobile computing device 206.

When the document 202 is initially loaded and rendered by the web browser having the first display configuration, areas of the document 202 corresponding to the first content slot 208 and a portion of the second content slot 210 are displayed together. Because some users may find concurrently displayed third-party content annoying or distracting, a content distribution system may enforce rules that prevent redundant third-party content from being displayed concurrently with each other (e.g., within the same viewing area in an expected presentation of the document 202). In some implementations, the content distribution system may block redundant third-party content items from being displayed in content slots 208 and 210 in the first display configuration. When the distance between the first content slot 208 and the fourth content slot 214 is sufficiently great (e.g., meets a specified distance criteria) that they are not displayed together, the content distribution system may permit redundant third-party content items to populate these two slots 208, 214. In contrast, in the second display configuration (FIG. 2B) on the mobile device 206, the area for the first content slot 208 is not shown with any of the other content slots 210, 212, 214 when the document 202 is initially loaded. As a result, the content distribution system may permit redundant third-party content items to be displayed together in the second display configuration, such as in the first content slot 208 and the second content slot 210. In some implementations, as discussed herein, additional or alternative criteria may be used as well to determine the eligibility of redundant third-party content within a particular presentation of an electronic document.

Figure 3:
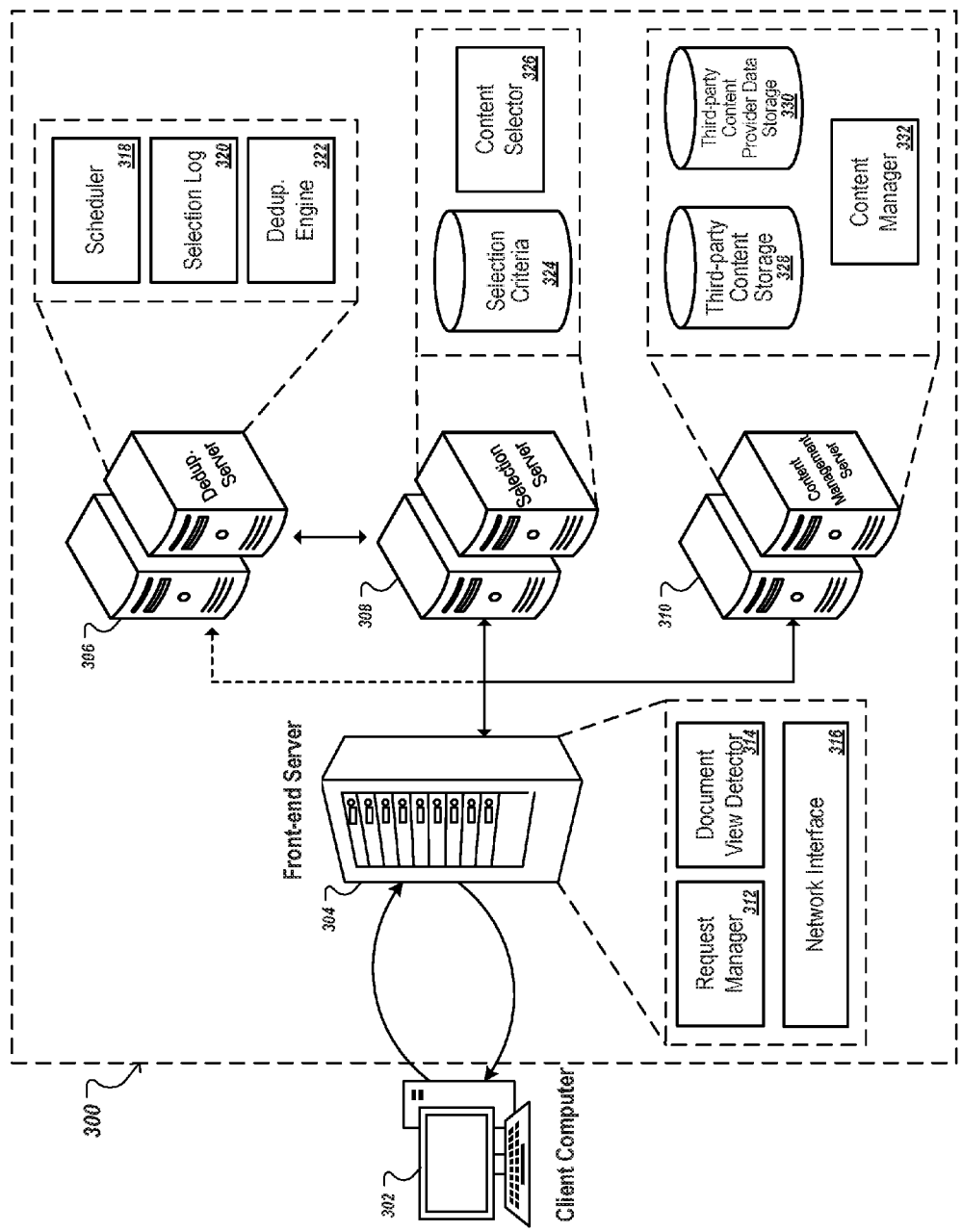
FIG. 3 is a block diagram of an example content distribution system that selects third-party content for presentation with an electronic document.

FIG. 3 depicts a block diagram of an example content distribution system 300 configured to receive third-party content requests, select third-party content items in response to requests, and transmit third-party content items over a network for display in a host electronic document. The system 300 is further configured to analyze one or more parameters associated with a request (e.g., request context) to determine an eligibility of redundant third-party content items for display in a particular presentation of an electronic document. Generally, the system 300 may determine eligibility of redundant third-party content items on a per-request basis. Redundant content eligibility can be determined, for example, according to a set of rules stored by the content distribution system 300.

The content distribution system 300 includes a front-end server 304, a deduplication server 306, a third-party content selection server 308, and a third-party content management server 310. Generally, each of these servers 304, 306, 308, and 310 can be implemented with one or more computers operating in one or more locations separately or in coordination with each other. All or some of the servers 304, 306, 308, and 310 may be integrated on common computer hardware, or they may be implemented separately on different computers with physically distinct hardware. The division of operations performed by the servers 304, 306, 308, and 310 as discussed herein is by way of example only. In some implementations, other configurations of computers may be provided that perform similar operations similar to those discussed herein.

The front-end server 304 provides an interface for the content distribution system 300 to interact with other computers over a communications network (e.g., the Internet). For example, FIG. 3 shows the front-end server 304 communicating with a client computer 302. The front-end server 304 receives requests for third-party content, performs initial processing of received requests, forwards information derived from requests to other appropriate components of the content distribution system 300, and transmits responses that the system 300 generates in response to requests. In some implementations, the front-end server 304 includes a network interface 316, a request manager 312, and a document view detector 314.

The network interface 316 provides an interconnection between the content distribution system 300 and one or more networks, which may be either public (e.g., the Internet) or private (e.g., a local area network). The network interface 316 may include one or more network interface cards, which for example, are configured to transmit and receive data over a packetized network. The network interface 316 may process incoming packets that correspond to third-party content requests, and may generate and transmit packets that define responses to the third-party content requests.

The request manager 312 is configured to analyze requests and perform various pre-processing operations on third-party content requests received by the system 300. In some implementations, the request manager 312 may parse a request to identify values of parameters that the system 300 is configured to use as input for determining the eligibility of redundant third-party content. The values for some parameters may be directly embedded within a message received by the front-end server 304 from a client computer 302, such as in an HTTP header. For example, a script or other machine-readable instructions in an electronic document loaded on a client computer 302, when executed, may cause the client computer 302 to generate requests that embed values of redundant-content eligibility parameters directly in request headers. The headers may be ignored by other systems that process such requests, but the request manager 312 may recognize these values and parse them appropriately. In some instances, the front-end server 304 may determine values of redundant-content eligibility parameters indirectly, based on other information contained in a request or based on context associated with the request. The types of redundant-content eligibility parameters that may be derived from a request are discussed in further detail with respect to the deduplication server 306 herein. By way of example, the request manager 312 may extract or derive information from a third-party content request that identifies the user that submitted the request, identifies the make or model of the computing device that will be presenting the third-party content in the electronic document, identifies a size (e.g., physical size, resolution) of a display screen on which the third-party content will be presented in the electronic document, identifies a layout or arrangement of content slots in which winning third-party content responsive to the request will be arranged (e.g., positions of the content slots) in the document, or a combination of two or more of these.

The document view detector 314 is generally configured to correlate different requests with particular presentations (e.g., viewings) of an electronic document. In some implementations, the document view detector 314 assigns a view identifier to each third-party content request that the system 300 receives. Requests that are assigned the same view identifier are deemed by the document view detector 314 to be related to the same presentation of a particular electronic document (e.g., a single page view of a web page by a particular user). Requests that are assigned the same page view identifier raise the prospect that redundant third-party content could be selected for all or some of these requests, unless the system 300 performs actions that mitigate the possibility of redundant third-party content. For example, a web page that includes multiple content slots for displaying respective instances of third-party content may generate separate requests to the content distribution system 300 for third-party content. The requests may be transmitted by the client computer 302 and received by the front-end server 304 in one or more messages. The document view detector 314 assigns a same view identifier to each of the requests, thereby flagging that each of the requests pertains to the same viewing of the electronic document.

Upon receiving a new third-party content request, the document view detector 314 can analyze one or more features of the request to determine whether it pertains to a new viewing of an electronic document or pertains to a previously identified viewing of an electronic document. If a request pertains to a new viewing (e.g., presentation) of an electronic document (e.g., a new page view by a given user), the document view detector 314 assigns a new view ID to the request, such as an integer or other data value that uniquely represents a new document view. If a request pertains to a previously identified viewing of an electronic document (e.g., a request for third-party content to be displayed in a second content slot in a web page for which the system 300 has previously selected content to be displayed in a first content slot in the web page), the document view detector 314 determines that the request matches the document view of a previously processed request, and assigns the new request the same view ID that was assigned to the previously processed matching request. As such, the document view detector 314 can correlate requests for third-party content that will be displayed within the same presentation of a given electronic document.

Examples of request features that can be provided as input to the document view detector 314 for the determination of an appropriate view ID for a request include an address (e.g., uniform resource locator (URL)) of the host electronic document on which the requested third-party content is to be displayed, a unique identifier of a user or user account associated with the request, a session identifier, browser cookie data, a timestamp indicating a time that the client computer submitted the request for electronic content or a time that the distribution system 300 received the request, an IP or other network address of the client computer 302, and a device identifier of the client computer 302 that submitted the request. Generally, the document view detector 314 can consider any combination of one or more of these features and others associated with requests for third-party content. For example, the document view detector 314 may maintain a log of all requests that the system has received 300 during a recent period of time (e.g., 5-10 seconds). The log can be stored in a cache memory of the front-end server 304 and can indicate the view ID assigned to each request and the set of features extracted from the request. When a new request is received, the document view detector 300 can compare features of the new request with features of requests stored in the logs. If a match is determined to one or more of the previous requests based on a result of the request feature comparison, the document view detector 314 assigns the same view ID to the new request as was assigned to the matching requests, as indicated by the log. If no match is determined, the document view detector 314 assigns a view ID to the new request that is different from the other view IDs of requests stored in the log. For example, a pair of third-party content requests from the same client computer 302 that occur within a short span of each other (e.g., 10 milliseconds, 100 milliseconds, 1 second) for content to be presented on a same host document can be correlated by the document view detector 314 as relating to a same viewing or presentation of the host document.

In some implementations, a host electronic document can include a script or other machine-readable instructions which, when executed, configure the client computer 302 (e.g., user device 106) to automatically generate a view ID associated with a particular presentation of the electronic document. The client computer 302 can insert the view ID into each third-party content request that corresponds to a particular viewing or presentation of the host document. The document view detector 314 can then correlate related requests based on the view ID that is expressly included in the third-party content requests from the client computer 302.

The content distribution system 300 further includes a deduplication server 306. The deduplication server 306 determines, for a given third-party content request, whether redundant third-party content is eligible for selection in response to the request. Generally, the eligibility of redundant third-party content, as determined by the deduplication server 306, can be communicated to the third-party content selection server 308, which performs an evaluation process to select winning third-party content for presentation in a host electronic document. The winning third-party content can be selected from a set of eligible third-party content, which may exclude redundant content if the deduplication server 306 determines that redundant content is ineligible for a given request.

In some implementations, the deduplication server 306 includes a scheduler 318, a selection log 320, and a deduplication engine 322. The scheduler 318 manages a queue of third-party content requests. The queue defines an ordered list of third-party content requests that are scheduled to be provided to the selection server 308 for determination of winning third-party content responsive to the respective requests. The queue provides a mechanism to serialize all or some requests received by the content distribution system 300, so that multiple requests pertaining to a same viewing or presentation of an electronic document can be appropriately recognized. In some examples, the scheduler 318 manages the queue in a first-in-first-out (FIFO) manner, thereby causing the selection server 308 to perform evaluation processes on requests in the order in which they are received.

The selection log 320 stores records about winning third-party content that selection server 308 has selected in response to previously processed requests. The selection log 320 may be implemented as a database or other data structures on one or more computers. The selection log 320 may include hundreds or thousands (or some other number) of entries, for example, which indicate information about previous third-party content selections made over a recent period of time. Each entry corresponds to a respective request, and indicates the view ID assigned to the request and one or more characteristics of particular third-party content selected in response to the request. These characteristics can include data that identifies the particular third-party content item selected in response to a request, data that identifies the third-party content provider of selected content, data that identifies a subject matter category of the selected content, or a combination of these. In some implementations, the deduplication server 306 updates the selection log 320 after each third-party content selection made by the selection server 308. The selection server 308 can send a message to the deduplication server 306 indicating the result of an evaluation process, including information about the winning-third-party content, which triggers the deduplication server 306 to add an entry to the selection log 320 corresponding to the result indicated by the selection server 308.

The deduplication server 306 can also include a deduplication engine 322. The deduplication engine 322 is configured to determine whether redundant third-party content is eligible as winning content for a given request. The deduplication engine 322 queries the scheduler 318 to identify a third-party content request that is scheduled to be evaluated by the selection server 308. The deduplication engine 322 then queries the selection log 320 to determine whether the identified request pertains to a same presentation or viewing of an electronic document as any other previously processed requests. For example, the view ID of the identified request can be compared to the view IDs of requests having entries in the selection log 320. If a match occurs between the view ID of the identified request and at least one request in the selection log 320, the deduplication engine 322 may proceed to determine eligibility of redundant third-party content. But if no match occurs between the view ID of the identified request and at least one request in the selection log 320, then the deduplication engine 322 need not determine the eligibility of redundant third-party content because the identified request is the first request to be processed for a particular viewing or presentation of an electronic document (and hence there is no redundant third-party content).

If the deduplication engine 322 determines that redundant third-party content may exist for a given request (e.g., due to a match identified between the view ID of the current request and the view ID of at least one previously processed request as indicated by the selection log 320), the deduplication engine 322 can determine an eligibility of third-party content for the request by applying a redundant-content eligibility model to one or more request parameters, as identified by the request manager 312. In some implementations, the deduplication engine 322 is configured to reduce the frequency of redundant third-party content selections across many requests, while nonetheless permitting redundant third-party content in appropriate circumstances that may be preferred by an end user, an operator of the content distribution system 300, a publisher of the host electronic document, or third-party content providers. The deduplication engine 322 may thus refine the decision of whether to permit or block redundant third-party content (e.g., rather than merely permitting or blocking all instances of redundant third-party content for a given viewing or presentation of an electronic document). As such, the content distribution system 300 may achieve at least some of the benefits that stem from reducing redundant third-party content selections (e.g., improved document presentation, fewer instances of redundant content transported over a network, improved user satisfaction), while also allowing third-party content items in appropriate circumstances.

The redundant-content eligibility model of the deduplication engine 322 characterizes the decision making process by which the eligibility of redundant third-party content is determined. In some implementations, the redundant-content eligibility model specifies a set of rules for redundant-content eligibility criteria. In some implementations, the redundant-content eligibility model may be a machine-learning model (e.g., a neural network), that classifies a request as permitting or not-permitting redundant third-party content based on various parameters associated with the request. The parameters associated with a request can be directly embedded in a request, and extracted by the request manager 312. In some implementations, particular parameters associated with the request may be determined indirectly by the request manager 312 based on information contained in the request or a context of the request. For example, the request may specify the make and model of a mobile computing device that made the request. To determine the display size or resolution of requested third-party content, the request manager 312 may derive these parameters based on external data that correlates makes and models of mobile computing devices with their respective display sizes or resolutions.

In some implementations, the deduplication engine 322 determines eligibility of redundant third-party content based on a display characteristic of the host electronic document in which requested third-party content is to be presented. In a first example, redundant third-party content may be deemed ineligible if the distance between a first third-party content slot (e.g., a display region for a previously selected instance of third-party content) and a second third-party content slot (e.g., a display region for a newly requested instance of third-party content) in a presentation of the electronic document is less than a pre-specified minimum distance. The distance between the third-party content slots may be a vertical distance, a horizontal distance, or a direct distance having both vertical and horizontal components. The distance may relate to particular positions of the third-party content slots, such as the top left corners of the slots or distance between a bottom edge of a first slot and a top edge of a second slot. Distances, or coordinates of content slots from which distances may be derived, can be specified directly in a third-party content request. The deduplication engine 322 may compare the distance between two content slots to a minimum distance. In some implementations, if the actual distance is less than the minimum distance, then redundant third-party content is deemed ineligible for selection.

In some implementations, the deduplication engine 322 can account for characteristics of the display configuration at the client computer 302, in addition to characteristics of the host electronic document, in determining eligibility of redundant third-party content. For example, the deduplication engine 322 may deem redundant third-party content ineligible for content slots that would appear together in a portion of the electronic document that displays when the electronic document is initially loaded at the client computer 302. Thus, the deduplication engine 322 may prevent redundant content that would display together "above the fold" in a particular presentation of an electronic document, before the user scrolls to another portion of the document. Because the size or layout of the initially displayed portion of the electronic document may vary based on the particular display configuration of the client computer 302 (e.g., size and resolution of a screen coupled to the client computer 302), values of these display configuration parameters can be provided as input to the deduplication engine 322 for determining whether two or more content slots would appear together in a portion of the electronic document, and thus whether redundant third-party content may be selected to populate these slots.

In some implementations, the deduplication engine 322 determines eligibility of redundant third-party content based on a performance characteristic of an initial third-party content item, one or more redundant third-party content items, or both. The content distribution system 300 can maintain performance data for individual third-party content items or groups of third-party content items. The performance data may include, for each third-party content item or group of third-party content items, one or more measures of user interaction with the respective third-party content item or group of third-party content items. These measures of user interaction can include, for example, click-through rates, conversion rates, and negative feedback selections. For example, if an initial third-party content item (e.g., an instance of third-party content that the system 300 has previously selected for display in a content slot) has a click-through rate or conversion rate that meets a pre-specified minimum click-through rate or conversion rate, the deduplication engine 322 may deem redundant third-party content ineligible for selection in another content slot of an electronic document. In another example, if a negative feedback metric associated with a third-party content item or group of third-party content items is sufficiently high, then other third-party content items that are redundant to the negatively rated third-party content items or group of third-party content items may be deemed ineligible for selection. The negative feedback metric may be derived, for example from a frequency of user selections to mute, close, or minimize third-party content items in past presentations of electronic documents, as well as a number of user interactions with a negative feedback element that enables users to expressly submit negative feedback about third party content. In another example, the distribution system 300 may track the performance of redundantly presented third-party content items. For third-party content items having one or more performance metrics that improved by a least a threshold amount when presented redundantly, the deduplication engine 322 may deem those items eligible for redundant selection responsive to a request.

In some implementations, the deduplication engine 322 determines eligibility of redundant third-party content based on a characteristic of the end user to whom the requested third-party content is presented. For example, the deduplication engine 322 may identify a demographic category of the end user associated with a particular request. The deduplication engine 322 may then access a demographic model that indicates the efficacy of redundant third-party content with respect to each of multiple different demographic categories. If the efficacy of redundant third-party content is sufficiently high for the appropriate demographic category, the deduplication engine 322 may deem redundant third-party content eligible for selection responsive to a request.

In some implementations, the deduplication engine 322 determines eligibility of redundant third-party content based on characteristics associated with a publisher of the host electronic document, third-party content providers, or an operator of the content distribution system 300. For example, publishers may indicate preferences to the content distribution system 300 regarding the presentation of redundant third-party content on the publisher's electronic documents. A publisher may indicate whether redundant third-party content should always be eligible for display on the publisher's documents, should never be eligible for display on the publisher's documents, or should only be eligible for display on the publisher's documents under certain conditions. Moreover, the publisher may specify redundant content eligibility rules on a per-document basis, or even on a per-content slot basis within individual documents. Additionally, a third-party content provider may indicate preferences to the content distribution system 300 regarding whether its third-party content may be displayed redundantly within particular presentations or viewings of electronic documents. The third-party content provider may indicate whether its content should always be eligible for redundant presentation, should never be available for redundant presentation, or should only be available for redundant presentation under specified conditions. The preferences of the third-party content provider may apply broadly to all of the provider's third-party content or to specific instances or groups of the provider's content. The deduplication engine 322 may reconcile the preferences of users, publishers, and third-party content providers to make a determination for a given request as to the eligibility of third-party content for the request.

In some implementations, the deduplication engine 322 determines eligibility of redundant third-party content based on a maximum number of redundant content items that are permitted to be displayed on a host electronic document, or a portion thereof. For example, an electronic document may include five content slots, but a maximum of two redundant third-party content items may be permitted to populate the five content slots. If the system 300 selects redundant instances of third-party content in response to requests for the first two content slots, then the deduplication engine 322 may deem redundant third-party content ineligible for selection in response to requests for the remaining three content slots. The maximum number of redundant third-party content items that may appear in a single presentation of an electronic document may be defined by the end user, the publisher of the electronic document, or an operator of the content distribution system 300.

In some implementations, the deduplication engine 322 determines eligibility of redundant third-party content based on a maximum number of redundant content items that are permitted to be served to an end user across multiple viewings or presentations of electronic documents over a period of time. The content distribution system 300 may have partnerships with many different publishers of electronic documents, and so users may be exposed to third-party content items any time the users visit electronic documents of partner publishers. The system 300 may track the number of times that particular respective instances of third-party content are presented to individual users over a period of time in one or more electronic documents from one or more publishers. The system 300 may impose a cap on the number of redundant content items that can be presented to a given user over a period of time. When the cap has been met, the deduplication engine 322 may deem redundant third-party content ineligible for selection in response to subsequent requests from a given user.

In some implementations, the system 300 can determine redundant content eligibility in a manner that optimizes interests of end users, an organization that operates the content distribution system 300, third-party content providers, and publishers of the electronic documents that present third-party content items. For example, upon receiving a third-party content request, the system 300 may analyze parameters associated with the request and determine a redundant content eligibility score that accounts for various factors that represent respective interests of one or more of the end user, content distributor, third-party content provider, and publisher associated with the request. The system 300 can compare the redundant-content score to a threshold eligibility score, and if the score satisfies the threshold, then redundant third-party content can be marked eligible for selection responsive to the request. Likewise, if the redundant-content score does not satisfy the threshold eligibility score, then redundant third-party content can be marked ineligible for selection responsive to the request. In some implementations, the system 300 may utilize predictive models (e.g., neural networks or other machine-learning models) to determine redundant content eligibility.

Next, the selection server 308 is the component of the content distribution system 300 that determines winning third-party content for a request, which is then transmitted to the client computer 302 for presentation in an electronic document. To determine winning third-party content, the selection server 308 performs an evaluation process on a set of eligible third-party content and selects, from among this set of content, one or more instances of third-party content to return in response to a request. The winning third-party content can be selected based on selection criteria 324 available to the selection sever 308. Selection criteria 324 can include, for example, respective keywords that characterize third-party content items and the host electronic document associated with a request. In some implementations, the selection criteria 324 can further include bids set forth by third-party content providers that indicate a price the third-party content provider is willing to pay for the provider's third-party content to be selected and returned for display in response to a request. The content selector 326 of the selection server 308 applies the selection criteria 324 to a given request and performs the evaluation process to select winning third-party content.

The selection server 308 determines a set of third-party content that is eligible for selection in response to each request. The content distribution system 300 includes third-party content storage 328 that can store many (e.g., thousands or millions) third-party content items. Not all of the stored content items may be eligible for selection in response to a given request, however. The selection server 308 excludes third-party content items that are deemed ineligible for selection response to a request. Third-party content items may be excluded from the eligible set for various reasons, but the concern here is redundant third-party content items. To prevent selection of redundant third-party content for a particular presentation of an electronic document, the selection server 308 is configured to exclude redundant content items from the eligible set of third-party content. In some implementations, the selection server 308 may exclude redundant content before performing the evaluation process that so that redundant content is unavailable for selection from an initial instance, thereby preventing unnecessary evaluation of the redundant content. In some implementations, the selection server 308 may not exclude redundant content until after the evaluation process is performed. For example, the content selector 326 may make an initial selection of winning third-party content for a request, and may then check whether the initially selected content is redundant content that should be excluded. If the initial selection is redundant, then the content selector 326 may repeatedly select a next best third-party content item until the selected content is deemed to be within the eligible set of third-party content and is not redundant.

In some implementations, the selection server 308 determines whether to exclude redundant content from the set of eligible third-party content for a given request by querying the deduplication server 306. In response to an indication from the deduplication server 306 that redundant third-party content is to be excluded, the selection server 308 determines which third-party content items constitute redundant third-party content. For example, the selection server 308 may access the selection log 320 to identify a first third-party content item that has previously been selected for the particular presentation of a given request. The selection server 308 may then determine one or more second third-party content items that are redundant to the first third-party content item based on identifying the occurrence of one or more pre-specified relationships between the first third-party content item and the one or more second third-party content items. In some implementations, the second third-party content items may be deemed redundant to the first third-party content item if the second third-party content items are substantially identical to the first third-party content item, if the second third-party content items relate to common subject matter as the first third-party content item (e.g., both promote a same product or service), if the second third-party content items were submitted by a same third-party content provider as the first third-party content provider, or a combination of these conditions.

In some implementations, after a third-party content request has been received and processed by the front-end server 304, the front-end server 304 may forward the request to one of multiple available content selection servers 308 (e.g., rather than the front-end server communicating directly with the deduplication server 306). The selection server 308 may then query the deduplication server 306 to determine whether redundant third-party content should be excluded from the evaluation process performed by the selection server 308 to select winning content.

In some implementations, the content distribution system 300 can further include a content management server 310. The content management server 310 can include a content manager 332, a third-party content storage 328, and a third-party content provider data storage 328. The content manager 332 provides an interface or platform for third-party content providers to upload or create third-party content items to the distribution system 300 and to manager parameters of a content distribution campaign. The third-party content storage 328 includes one or more storage devices that store third-party content items and metadata associated with third-party content items. The third-party content provider data storage 330 stores account information for third-party content providers and other partners of the content distribution system 300.

Figure 4:
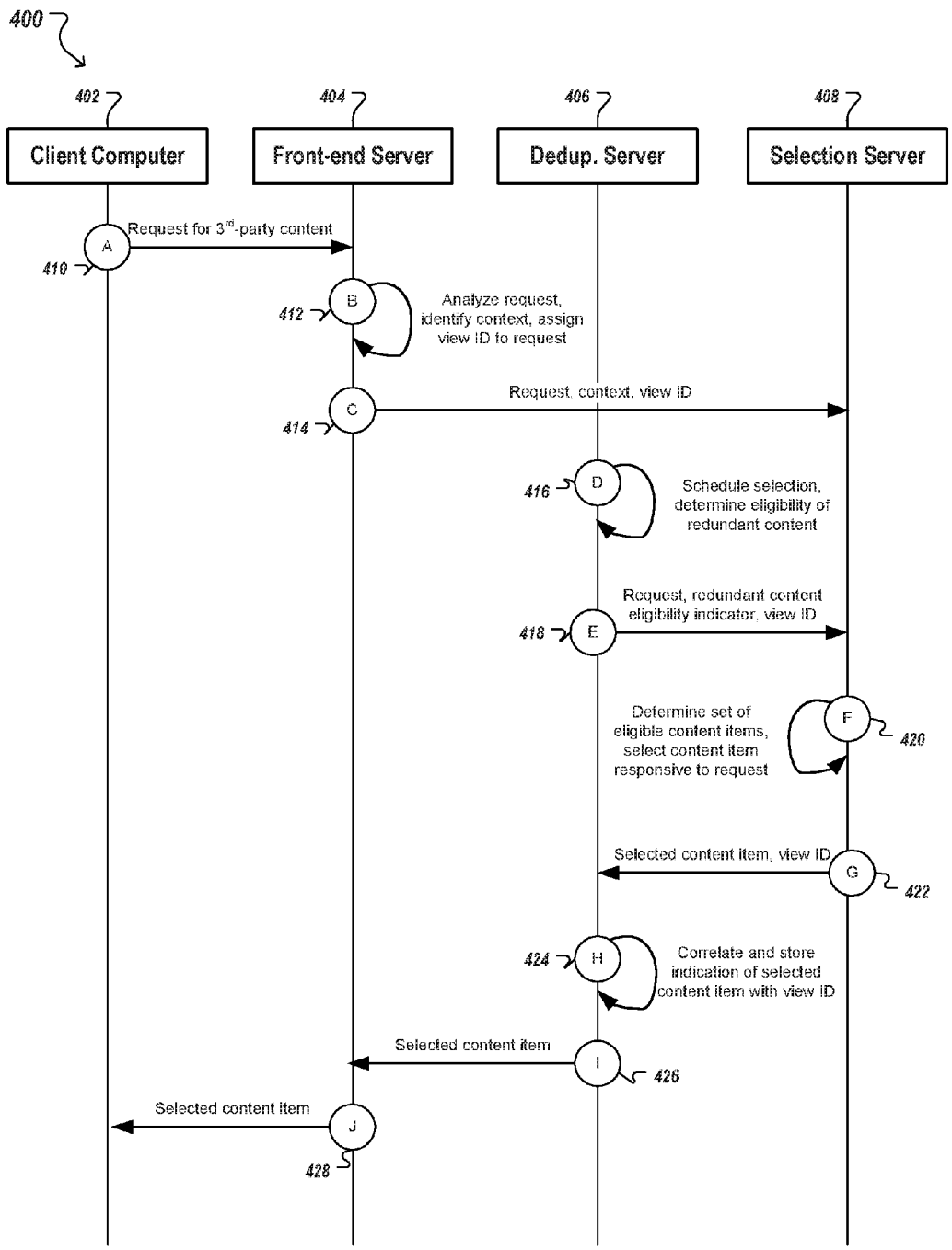
FIG. 4 shows an activity diagram of an example process for processing a third-party content request.

Turning to FIG. 4, an activity diagram is shown of an example process 400 for processing a third-party content request, including determining whether redundant third-party content is eligible for selection in response to the request. In some implementations, the process 400 can be carried out by a client computer 402 and various components of a content distribution system, such as the system 300 described with respect to FIG. 3.

The process 400 begins at stage A (410), when the client computer 402 transmit a request for third-party content to a front-end server 404 of a content distribution system. The request may include values of one or more parameters (e.g., context data) that the system is configured to use in determining eligibility of third-party content and selecting winning third-party content in response to the request. At stage B (412), the front-end server 404 parses the request and identifies context data specified in the request. The context data may include, for example, an indication of the host electronic document that is configured to display the requested third-party content, information about the user or user's device that submitted the request, display characteristics of the host electronic document, and other information. The front-end server 404 also assigns a view ID to the request, which is a unique value corresponding to the particular presentation or viewing of the host electronic document to which the request pertains.

At stage C (414), the front-end server 404 communicates data characterizing the request, identified context data, and view ID to a selection server 408 of the content distribution system. The selections server can then query a deduplication server 406, and at stage D (416), the deduplication server 406 schedules a content selection evaluation process for the request by adding the request to a queue. The deduplication server 406 also checks the view ID to determine whether other requests have been received that pertain to the same presentation or viewing of the host electronic document. If other requests have been received pertaining to the same presentation or viewing of the host electronic document, the deduplication server 406 further determines whether redundant third-party content is eligible for selection in response to the request. This determination may be made based on context data from the request, including for example a display configuration of the client computer 402, a display characteristic of the host electronic document, a performance characteristic of a previously selected third-party content item or of redundant third-party content items, a characteristic of an end user of the client computer 402, a pre-defined maximum number of redundant third-party content items that are permitted for a particular presentation of the host electronic document, or a pre-defined maximum number of redundant third-party content items that are permitted to be selected to the end user of the client computer 402 across one or more electronic documents over a period of time.

At stage E (418), the deduplication server 406 triggers the selection server 408 to invoke an evaluation process to select winning third-party content in response to the request. For example, the deduplication server 406 can transmit to the selection server 408 an indication of the view ID assigned to the request and whether redundant third-party content is eligible for selection. At stage F (420), the selection server 408 determines a set of eligible content items and performs an evaluation process that selects a winning instance of third-party content for the request. The set of eligible content items may exclude redundant third-party content if the deduplication server 406 has determined that redundant content is ineligible for selection in response to the request.

At stage G (422), after selecting one or more winning instances of third-party content for the request, the deduplication server 408 forwards an indication of the selected content item and the view ID of the request to the deduplication server 406. At stage H (424), the deduplication server 406 records an entry in a selection log about the one or more winning instances of third-party content for the request and the associated view ID. The entry in the selection log can later be used by the deduplication server 406 to verify whether third-party content has previously been selected for a particular presentation of an electronic document. At stage I (426), the deduplication server 406 (or the selection server 408) forwards the selected third-party content to the front-end server 404. At stage J (428), the front-end server 404 transmits data corresponding to the selected third-party content to the client computer 402 in satisfaction of the third-party content request.

Figure 5:
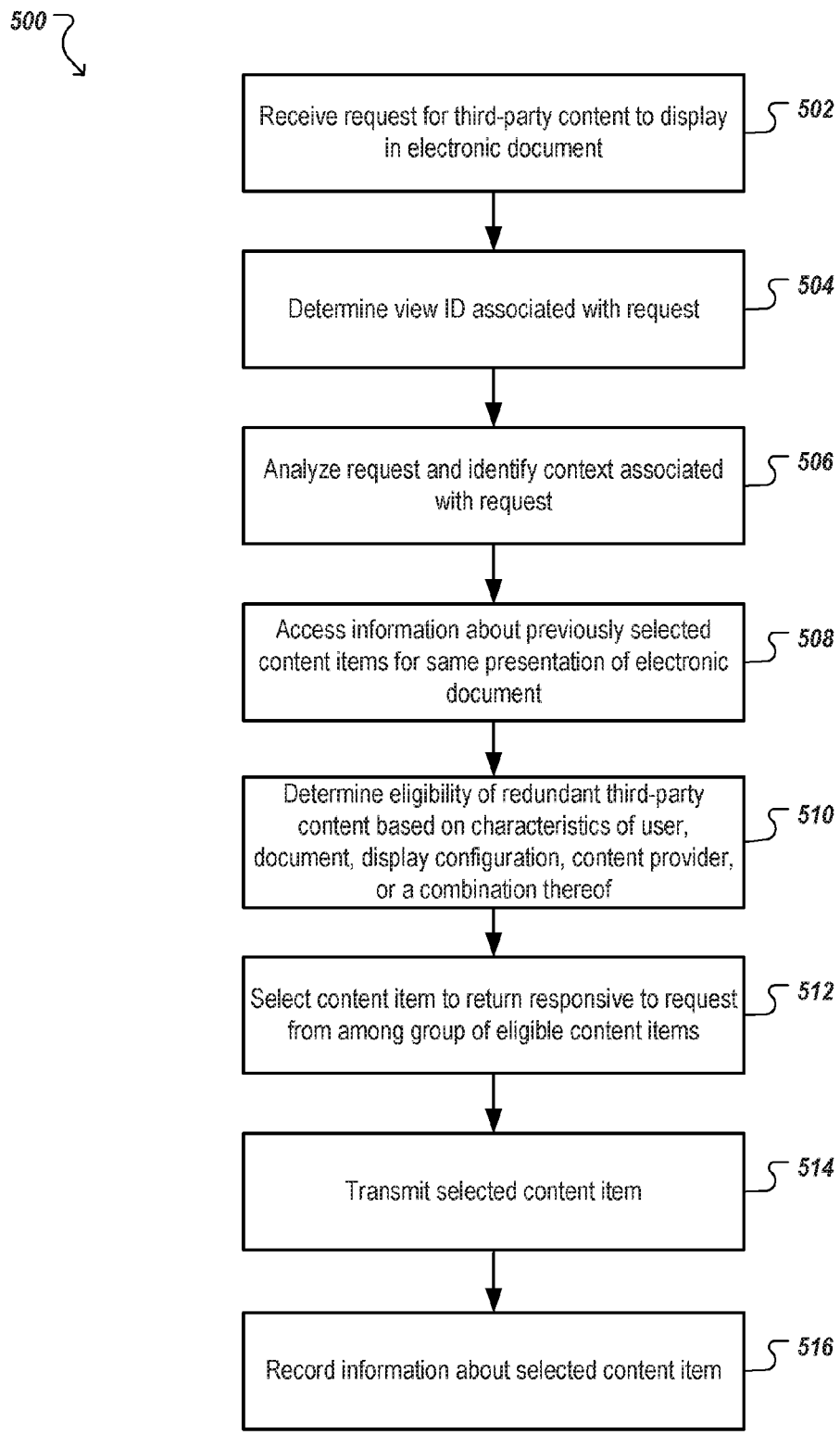
FIG. 5 depicts a flowchart of an example process for determining an eligibility of redundant third-party content for presentation with an electronic document.

Referring to FIG. 5, a flowchart is shown of an example process 500 for processing a request for third-party content and determining an eligibility of third-party content for selection in response to the request. The process 500 may be carried out, in some implementations, by the content distribution system 300 of FIG. 3. In some implementations, instructions stored on one or more non-transitory computer readable media can cause one or more data processing apparatus (e.g., servers) to perform operations of the process 500 when the instructions are executed by the one or more data processing apparatus.

At stage 502, the process begins by receiving at the content distribution system a request for third-party content to be displayed in a host electronic document. The content distribution may receive the request from a client computer (e.g., user device) over the internet or other public or private network. In some implementations, the request is initially received and processed by a front-end server of the content distribution system, e.g., the front-end server 304 of FIG. 3.

At stage 504, the system assigns a view ID to the request, which indicates a particular presentation of the host electronic document to which the request pertains. The system is configured to generate a unique view ID for each unique viewing or presentation of a host electronic document. For example, a new view ID may be assigned to a first request that the system receives for a particular view of a web page by a user. If the system detects that a subsequently received request for third-party content also relates to the same view of the web page by the user, then the system assigns the same view ID to the subsequent request as was assigned to the first request. Different requests that relate to a same viewing or presentation of an electronic document can be correlated, for example, based on features of third-party content request such as an address of the host electronic document, a time that the request was submitted by the client device or received by the content distribution system, a user ID, a client device ID, an IP address associated with a request, or a combination of these and other information. The view ID may be assigned by a document view detector, e.g., the document view detector 314 of FIG. 3.

At stage 506, the system analyzes the request and identifies context associated with the request that the system uses to determine redundant third-party content eligibility. The request may include or otherwise indicate values of parameters relating to context of the request, such as an indication of a particular user that is logged into an account associated with the request, information that characterizes a display characteristic of the host electronic document (e.g., distance between content slots on the page), information that characterizes a display configuration of the requesting device, and other parameters discussed above. The system may parse the request and extract or otherwise retrieve the values of the parameters that indicate a context of the request. In some implementations, the request can be processed by a request manager, e.g., the request manager 312 of FIG. 3.

At stage 508, the system accesses information (e.g., a selection log) that indicates previous selections of third-party content for requests, and at stage 510, the system determines, based on the request context and records of previous selections of third-party content, whether redundant third-party content is eligible for selection in response to the current request. First, the system determines whether third-party content has previously been selected for the same viewing or presentation of an electronic document related to a current request. If the system has previously selected third-party content for the same viewing or presentation of the electronic document, the system then determines the eligibility of redundant third-party content for the request. The system may include a deduplication server, e.g., the deduplication server 306 of FIG. 3, which determines the eligibility of redundant third-party content. In some implementations, the system determines eligibility of third-party content based on one or more of a display characteristic of the host electronic document, a display configuration at the device that will be display the selected third-party content with the electronic document, a pre-specified maximum number of redundant instances of electronic content that are permitted to be displayed in a given viewing or presentation of an electronic document, a performance characteristic of one or more third-party content items, a characteristic of an end user, a characteristic of a third-party content provider, a characteristic of a publisher of the electronic document, and other criteria.

At stage 512, the system selects a winning instance of third-party content for the request based on one or more selection criteria. The winning third-party content can be selected from among a set of eligible content items, which may exclude redundant third-party content. In some implementations, the winning third-party content is selected by a selection server, e.g., the selection server 308 of FIG. 3. The winning third-party content may be selected, for example, based on a determined match between subject matter of the host electronic document and the winning third-party content, based on bids of third-party content providers, or a combination of these and other factors.

At stage 514, the system transmits the winning third-party content to the client computer that made the third-party content request. In some implementations, the winning third-party content is transmitted by a network interface of the front-end server of the content distribution system, e.g., the network interface 316 of front-end server 304 of FIG. 3. The system may transmit the content itself, or may transmit instructions to the client computer that cause the client computer to access or retrieve the content from one or more storage locations.

At stage 516, the system records in the selection log information about the winning third-party content that was selected for the request. For example, the system may add an entry to the selection log that includes the view ID of the request, an identifier of a winning third-party content item, an identifier of the third-party content provider of the winning third-party content item, or a combination of these. Accordingly, based on the added entry, the system can check subsequently processed requests for third-party content against the selection log to determine a set of redundant third-party content that may be excluded if redundant content has been deemed ineligible. In one example, the system generates an entry in the selection log that includes the view ID of a request and an identifier of the source (e.g., content provider) of the third-party content item. The system can then exclude other instances of third-party content from the same source from the set of eligible content that can be selected in response to a subsequent request, based on identifying the source ID in the selection log.

Figure 6:
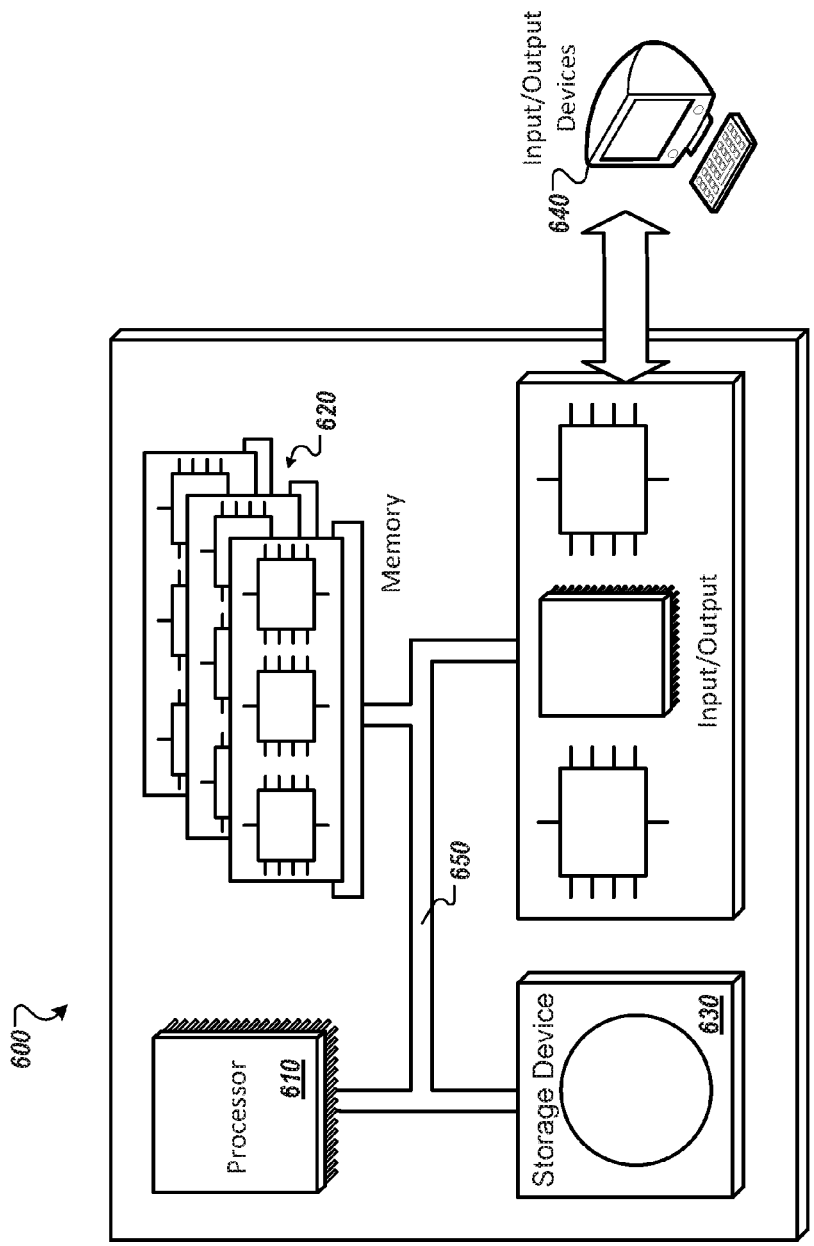
FIG. 6 is a schematic diagram of an example computer system that can be used to carry out the operations described in association with the systems, methods, devices, and other techniques disclosed herein.

FIG. 6 is a schematic diagram of a computer system 600. The system 600 can be used to carry out the operations described in association with any of the computer-implemented methods, systems, devices, and other techniques described previously, according to some implementations. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, comprising:
one or more content storage devices storing third-party content that have been made available by various third parties for distribution over a network;
a front-end server, including one or more processors, that (i) receives a request for third-party content to display in a particular presentation of an electronic document at a client device and (ii) serves third-party content identified in response to the request over the network and to the client computing device for display in the particular presentation of the electronic document;
a deduplication apparatus, including one or more processors, that determines, in response to identifying that a particular instance of third-party content has previously been selected for display in the particular presentation of the electronic document, and based at least on a distance between (i) a first proposed display position of the particular instance of third-party content in the particular presentation of the electronic document and (ii) a second proposed display position for the requested third-party content in the particular presentation of the electronic document, whether one or more other instances of third-party content that are deemed redundant to the particular instance of third-party content are eligible for selection responsive to the request; and a content selection apparatus, including one or more processors, that selects a second instance of third-party content, from among a group of eligible third-party content stored on the one or more content storage devices, to return to the client computing device in response to the request, wherein based on an indication from the deduplication apparatus that the one or more redundant instances of third-party content are ineligible for selection responsive to the request, the content selection apparatus excludes the one or more redundant instances of third-party content from the group of eligible third-party content such that the second instance of third-party content that is selected to return to the client computing device in response to the request is not among the one or more redundant instances of third-party content.

2. The computing system of claim 1, wherein the distance is a vertical distance between (i) the first proposed display position of the particular instance of third-party content in the particular presentation of the electronic document and (ii) the second proposed display position for the requested third-party content in the particular presentation of the electronic document.

3. The computing system of claim 1, wherein the deduplication apparatus determines whether the one or more redundant instances of third-party content are eligible for selection responsive to the request by:
identifying a display size of a user interface at the client device in which the particular presentation of the electronic document is to be displayed; and
determining, based on the identified display size and proposed display positions of the requested third-party content and the particular instance of third-party content, whether the requested third-party content and the particular instance of third-party content would be displayed concurrently with each other within the user interface.

4. The computing system of claim 1, wherein the deduplication apparatus determines whether the one or more redundant instances of third-party content are eligible for selection responsive to the request further based on whether a pre-defined maximum number of redundant instances of third-party content have previously been selected for display in the particular presentation of the electronic document.

5. The computing system of claim 1, wherein the deduplication apparatus is configured:
(i) to identify a count that indicates a number of times that instances of third-party content deemed redundant to the particular instance of third-party content have been previously provided for presentation, in one or more presentations of the electronic document or other electronic documents, to a same user that is associated with the request or to the same client computing device associated with the request; and
(ii) to determine, based on the count, whether the one or more redundant instances of third-party content are eligible for selection responsive to the request.

6. The computing system of claim 1, wherein the deduplication apparatus determines whether the one or more redundant instances of third-party content are eligible for selection responsive to the request further based on a characteristic of the particular instance of third-party content.

7. The computing system of claim 6, wherein the characteristic of the at least one of the redundant instances of third-party content comprises a click-through rate or a conversion rate of the particular instance of third-party content.

8. The computing system of claim 1, wherein the deduplication apparatus determines whether the one or more redundant instances of third-party content are eligible for selection responsive to the request further based on a score associated with at least one of the redundant instances of third-party content, wherein the score indicates a level of user satisfaction associated with the at least one of the redundant instances of third-party content.

9. The computing system of claim 1, wherein the electronic document is a web page, a word processing document, a spreadsheet, a slide show, or a screen of a native application installed on the client computing device.

10. The computing system of claim 1, wherein the particular instance of third-party content comprises at least one of an image, an animation, a video, or text.

11. The computing system of claim 1, wherein the computing system deems the one or more other instances of third-party content redundant to the particular instance of third-party content based on at least one of (i) the one or more other instances of third-party content being identical to the particular instance of third-party content, (ii) the one or more other instances of third-party content and the particular instance of third-party content being provided to the computing system by a same or related third party, or (iii) the one or more other instances of third-party content relating to common subject matter as the particular instance of third-party content.

12. A computer-implemented method, comprising:
receiving, by a computing system, a request for third-party content to display in a particular presentation of an electronic document at a client computing device;
identifying, by the computing system, that a first instance of third-party content has previously been selected for display in the particular presentation of the electronic document;
determining, by the computing system and based at least on a distance between (i) a first position in the particular presentation of the electronic document where the first instance of third-party content is proposed for display and (ii) a second position in the particular presentation of the electronic document where the requested instance of third-party content is proposed for display, an eligibility of one or more instances of third-party content that are deemed redundant to the first instance of third-party content for selection responsive to the request;
in response to determining that the one or more redundant instances of third-party content are ineligible for selection responsive to the request, excluding the one or more redundant instances of third-party content from a group of eligible instances of third-party content;
selecting, from among the group of eligible instances of third-party content and based on one or more selection criteria, a second instance of third-party content to return to the client computing device responsive to the request; and
transmitting, from the computing system and to the client computing device for display in the particular presentation of the electronic document, the second instance of third-party content.

13. The computer-implemented method of claim 12, comprising:

identifying a performance characteristic of the first instance of third-party content; and determining the eligibility of the one or more instances of third-party content that are deemed redundant to the first instance of third-party content based on the performance characteristic of the first instance of third-party content.

14. The computer-implemented method of claim 13, wherein the performance characteristic of the first instance of third-party content comprises at least one of a conversion rate associated with the first instance of third-party content or a click-through rate associated with the first instance of third-party content.

15. One or more non-transitory computer-readable storage devices storing instructions thereon that, when executed by one or more processors, cause performance of operations comprising:

receiving, by a computing system, a request for third-party content to display in a particular presentation of an electronic document at a client computing device;

identifying, by the computing system, that a first instance of third-party content has previously been selected for display in the particular presentation of the electronic document;

determining, by the computing system and based at least on a distance between (i) a first position in the particular presentation of the electronic document where the first instance of third-party content is proposed for display and (ii) a second position in the particular presentation of the electronic document where the requested instance of third-party content is proposed for display, an eligibility of one or more instances of third-party content that are deemed redundant to the first instance of third-party content for selection responsive to the request;

in response to determining that the one or more redundant instances of third-party content are ineligible for selection responsive to the request, excluding the one or more redundant instances of third-party content from a group of eligible instances of third-party content;

selecting, from among the group of eligible instances of third-party content and based on one or more selection criteria, a second instance of third-party content to return to the client computing device responsive to the request; and transmitting, from the computing system and to the client computing device for display in the particular presentation of the electronic document, the second instance of third-party content.

16. The one or more non-transitory computer-readable media of claim 15, wherein the operations comprise:

identifying a performance characteristic of the first instance of third-party content; and determining the eligibility of the one or more instances of third-party content that are deemed redundant to the first instance of third-party content based on the performance characteristic of the first instance of third-party content.

17. The one or more non-transitory computer-readable media of claim 16, wherein the performance characteristic of the first instance of third-party content comprises at least one of a conversion rate associated with the first instance of third-party content or a click-through rate associated with the first instance of third-party content.

* * * * *

UNITED STATES PATENT AND TRADEMARK OFFICE
CERTIFICATE OF CORRECTION

| | | |
|---|---|---|
| PATENT NO. | : 9,998,525 B1 | Page 1 of 1 |
| APPLICATION NO. | : 15/212965 | |
| DATED | : June 12, 2018 | |
| INVENTOR(S) | : Lipus et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 145 days.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*